United States Patent Office 2,902,403
Patented Sept. 1, 1959

2,902,403

SUBSTITUTED AMINO-BENZ [b] ACRIDINES

Edward F. Elslager, St. Clair Shores, and Marie-Jo Sullivan, Grosse Pointe Woods, Mich., assignors to Parke, Davis & Company, Detroit, Mich., a corporation of Michigan No Drawing. Application December 3, 1956
Serial No. 625,598

9 Claims. (Cl. 167—65)

This invention relates to new chemical compounds and to methods for producing the same. More particularly, the invention relates to novel benz[b]acridine compounds and acid salts thereof which in free base form have the formula,

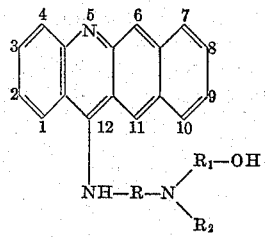

where R is a divalent alkyl radical containing from 2 to 5 carbon atoms inclusive, $R_1$ representa a divalent alkyl radical containing from 2 to 6 carbon atoms inclusive, and $R_2$ represents a hydrogen or alkyl or hydroxyalkyl radical containing from 2 to 6 carbon atoms inclusive, or taken together with —$R_1$—OH and —N< represents a saturated heterocyclic ring such as a pyrrolidino or piperidino ring containing a hydroxy, hydroxymethyl or hydroxyethyl substituent.

The compounds of the invention possess useful chemotherapeutic properties, especially as amebicidal agents, being particularly effective in combatting E. histolytica.

The new hydroxy benz[b]acridine compounds occur in the form of the free base having the above formula or as the addition salt of an organic or inorganic acid. In general, the invention contemplates the salts of any relatively nontoxic organic or inorganic acid. Some typical examples of these salts are the hydrochloride, hydrobromide, sulphate, phosphate, oxalate, sulfamate, sulfonate, acetate, lactate, tannate, tartrate, gluconate, citrate, penicillinate, arsanilate, arsonate, fumagillinate and the like. As examples of preferred salts there may be mentioned the 5,5'-methylene disalicylate, 4,4'-methylene bis-(3-hydroxy-2-naphthoate), methylene di-o-cresotinate, 8-hydroxy-7-iodo-5-quinoline sulfonate, N-acetyl-4-hydroxy-m-arsanilate, N-glycolyl-p-arsanilate, N,N'-ethylene bis-(p-arsanilate), p-ureidobenzenearsonate, benzylpenicillinate, phenoxymethylpenicillinate, fumagillinate and the like. Certain of these salts are particularly useful in that they possess enhanced amebicidal, and in some cases antibacterial, properties.

In accordance with the invention the benz[b]acridine compounds are produced by condensing an amino alcohol of formula,

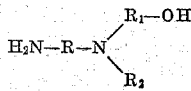

with a 12-substituted benz[b]acridine compound having the formula,

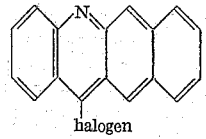

where R, $R_1$ and $R_2$ have the above-mentioned significance. In carrying out the condensation it will usually be satisfactory to employ substantially equivalent quantities of the reactants. If desired an excess of either of the reactants may be employed. The use of the amino alcohol in excess is preferred, inasmuch as it serves in most cases as a particularly useful solvent. Although it is ordinarily unnecessary, an anhydrous inert organic solvent such as benzene, toluene, xylene, dioxane, petroleum ether and the like, may be employed. The temperature of the reaction can be varied considerably and is not particularly critical. In general, the reaction is favored by temperatures in excess of 75° C. Preferably, the reaction is carried out in the range from about 75 to 150° C. If desired the reaction can be carried out under elevated pressure as, for example, in a sealed tube. Condensation catalysts may also be employed. For example, copper salts, copper dust and in particular cuprous chloride can be advantageously employed. In accordance with preferred practice, the reaction is carried out employing a 12-halobenz[b]acridine as a starting material, in the presence of an excess of phenol. In this case, the corresponding phenoxy benz[b]acridine hydrohalide is first formed and the reaction is continued, preferably without isolating the phenoxy benz[b]acridine compound. Further reaction of the phenoxy benz[b]acridine with the amino alcohol gives the desired 12-hydroxyalkylamino-alkylaminobenz[b]acridine compound.

As indicated above, the benz[b]acridine compounds of the invention occur in either the free base or acid salt form. Starting with the salt, the corresponding free base is obtained by dissolving the salt in a suitable solvent such as water, ethanol, etc., and neutralizing the solution with an inorganic or organic base such as sodium hydroxide, ammonium hydroxide, sodium carbonate, potassium carbonate, tertiary organic amines and the like. In some instances it will be desirable to obtain the salt from the free base. This is accomplished by reacting the free base with the corresponding organic or inorganic acid in a suitable solvent.

A particularly useful salt is derived from the free base and 8-hydroxy-7-iodo-5-quinolinesulfonic acid by reacting in aqueous solution the dihydrochloride salt of the former with a sodium or potassium salt of the latter. Upon completion of the reaction the desired sulfonic acid salt separates out and is isolated from the reaction mixture.

The following compounds are representative of the various benz[b]acridine compounds which are contemplated by the present invention:

(1) 2 - {methyl[2 - (12 - benz[b]acridinylamino)ethyl] - amino}ethanol, sulfate.

(2) 4,4' - methylene - bis(3 - hydroxy - 2 - naphthoic acid) salt of 2,2'-[2-(12-benz[b]acridinylamino)-ethylimino]diethanol.

(3) 1 - [2 - (12 - benz[b]acridinylamino)ethyl] - 3 - piperidinol, dihydrochloride.

(4) 1 - [4 - (12 - benz[b]acridinylamino)butyl] - 3 - pyrrolidinol, diphosphate.

(5) 2 - {ethyl[4 - (12 - benz[b]acridinylamino)butyl] - amino}ethanol.
(6) 6 - {[3 - (12 - benz[b]acridinylamino)propyl]ethyl-amino}-1-hexanol, dihydrochloride.
(7) 1,1' - [3 - (12 - benz[b]acridinylamino)propylimi-no]-di-2-propanol, dihydrobromide.
(8) 1 - [3 - (12 - benz[b]acridinylamino)propyl] - 2 - piperidineethanol.
(9) 2 - {[3 - (12 - benz[b]acridinylamino)propyl]hexyl-amino}ethanol, dihydrochloride.
(10) 1 - [5 - (12 - benz[b]acridinylamino)pentyl] - 3 - piperidinol, bispenicillin G salt.
(11) 1,1' - [3 - (12 - benz[b]acridinylamino)propylimi-no] - bis[2 - methyl - 2 - propanol], dicitrate.
(12) 1 - [3 - (12 - benz[b]acridinylamino)propyl - 2,2,6-trimethyl-4-piperidinol, dihydrochloride.
(13) 2,2' - [5 - (12 - benz[b]acridinylamino)pentyl-imino]-diethanol, dihydrochloride.
(14) 4,4' - [5 - (12 - benz[b]acridinylamino)pentyl-imino]-dibutanol, dihydrochloride.
(15) 1 - [5 - (12 - benz[b]acridinylamino)amyl] - 2 - piperidinemethanol, diacetate.
(16) 2 - {[4 - (12 - benz[b]acridinylamino)butyl]ethyl-amino}ethanol, bispenicillin G salt.
(17) 5,5' - [2 - (12 - benz[b]acridinylamino)ethylimi-no]-dipentanol.
(18) 2 - {butyl[3 - (12 - benz[b]acridinylamino)propyl]-amino}ethanol, bis-(N-glycolyl-p-arsanilic acid) salt.
(19) 3 - [3 - (12 - benz[b]acridinylamino)propylamino]-propanol, dihydrochloride.
(20) 2 - {[4 - (12 - benz[b]acridinylamino)pentyl]-butylamino}ethanol, dihydrochloride.
(21) 3 - {[3 - (12 - benz[b]acridinylamino)propyl]-methylamino}-1-propanol, bis-(N-acetyl-4-hydroxy-m-arsanilic acid) salt.
(22) 6 - [3 - (12 - benz[b]acridinylamino)propylamino]-hexanol, dihydrobromide.

*Example 1*

A mixture of 10 g. of 12-chlorobenz[b]acridine and 40 g. of phenol is stirred and heated on a steam bath for fifteen minutes, and 7.9 g. of 2-[(3-aminopropyl)pentyl-amino]-ethanol is then added. After heating for two hours the mixture is cooled and poured into a solution of 10 ml. of concentrated hydrochloric acid in 125 ml. of acetone. After chilling, the desired product, 2-{[3-(12-benz[b]acridinylamino)propyl]penylamino}ethanol, di-hydrochloride, precipitates and is collected by filtration. After recrystallization from an ethanol-ethyl acetate mixture, the product is obtained as the monohydrate, M.P. 150° C.

2-[(3-aminopropyl)pentylamino]ethanol, employed as a starting material for the above procedure, may be prepared as follows: 52.6 g. of 2-pentylaminoethanol is cooled below 30° C. and treated dropwise with 29 ml. of acrylonitrile over a period of seven minutes, with stirring. The reaction mixture is stirred for two hours at room temperature, heated to 80° C. on a water bath for one hour and allowed to stand at room temperature for eighteen hours. The excess acrylonitrile is removed in vacuo, and the residue hydrogenated at 120° C. and 1000 p.s.i.g. in 300 ml. of ethanol saturated with ammonia, over Raney nickel catalyst. Fractional distillation in vacuo of the resulting mixture yields the desired 2-[(3-aminopropylamino)pentylamino]ethanol as a colorless liquid, B.P. 162–165° C./16 mm., $n_D^{28}$ 1.4664.

*Example 2*

A mixture of 13 g. of 12-chlorobenz[b]acridine and 40 g. of phenol is stirred and heated on a steam bath for fifteen minutes and 8.1 g. of 2,2'-(3-aminopropylimino)di-ethanol is subsequently added. After heating for about three hours on the steam bath, the mixture is cooled to 50° C. and poured into a stirred solution of 10 ml. of concentrated hydrochloric acid in 500 ml. of acetone. The acetone-hydrochloric acid mixture is decanted from the viscous oil which separates and the residue is dissolved in hot isopropanol and treated with decolorizing charcoal. After chilling, the precipitated material is collected by filtration. The product, 2,2'-[3-(12-benz[b]-acridinylamino)propylimino]diethanol, dihydrochloride, is recrystallized from water-isopropanol. Upon standing, the product takes up one and one-half moles of water in which form the product melts at 162–165° C.

2,2'-(3-aminopropylimino)diethanol, employed as a starting material in the above procedure, can be prepared from diethanolamine and acrylonitrile in accordance with the method set forth under Example 1 herein for the preparation of 2-[(3-aminopropyl)pentylamino]-ethanol.

*Example 3*

A hot solution of 3.9 g. of 2,2'-[3-(12-benz[b]acridin-ylamino)propylimino]diethanol in 50 ml. of methanol is added to a hot solution of 6.2 g. of N-glycolyl-p-arsanilic acid (contains 12.5% water) in 160 ml. of 75% methanol. The mixture is heated on the steam bath for ten minutes, filtered hot, and the methanol removed in vacuo. Trituration of the residue with several portions of an acetone-ether mixture yields the desired 2,2'-[3-(12-benz[b]-acridinylamino)propylimino]diethanol, bis-(N-glycolyl-p-arsanilic acid) salt.

*Example 4*

A mixture of 26.4 g. of 12-chlorobenz[b]acridine and 80 g. of phenol is stirred and heated on the steam bath for fifteen minutes and 16 g. of 2-[(3-aminopropyl)-ethylamino]ethanol is subsequently added. Heating and stirring on the steam bath is continued for three hours. Upon cooling, the reaction mixture is poured into a stirred solution of 100 cc. of concentrated hydrochloric acid in 1 liter of acetone. A dark red gum separates, and the mixture is allowed to stand for eighteen hours at room temperature. The red solid is collected by filtration, dried in vacuo, and recrystallized from an ethanol-ether mixture. The product is 2-{[3-(12-benz[b]-acridinylamino)propyl]ethylamino}ethanol, dihydrochloride, containing two moles of water of hydration; M.P. 153–156° C.

2-[(3-aminopropyl)ethylamino]ethanol, employed as a starting material in the above procedure, can be prepared from 2-ethylaminoethanol, acrylonitrile and hydrogen in accordance with the method set forth under Example 1 herein for the preparation of 2[(3-aminopropyl)pentyl-amino]ethanol.

*Example 5*

A solution of 9.4 g. of 2-{[3-(12-benz[b]acri-dinylamino)propyl]ethylamino}ethanol, dihydrochloride, monohydrate in 100 ml. of warm water is slowly added with vigorous mechanical stirring to a warm solution of 11.8 g. (0.04 mole) of N-acetyl-4-hydroxy-m-arsanilic acid, monosodium salt, in 400 ml. of water. Upon cooling, the salt precipitates, and is collected by filtration, washed with water, and dried in vacuo. This is the desired 2 - {[3 - (12 - benz[b]acridinylamino)propyl]ethyl-amino}ethanol, bis-(N-acetyl-4-hydroxy-m-arsanilic acid) salt.

*Example 6*

A mixture of 52.6 g. of 12-chlorobenz[b]acridine and 160 g. of phenol is heated to 50° C. on a steam bath with mechanical stirring; 33.2 g. of 2-[(5-aminopentyl)ethyl-amino]ethanol is added and the mixture is stirred and heated at 110° C. for two hours. Upon cooling, the reaction mixture is poured slowly into a solution of 350 g. of potassium hydroxide in 2 liters of water. The resulting viscous oil is separated from the alkaline solution and extracted with ether. The ether extract is washed with water and dried over potassium carbonate. After twenty-four hours, the drying agent is removed by filtration and the ether filtrate is mixed with an ether solution containing 26.2 g. of salicylic acid. The oil which separates is caused to solidify by chilling and scratching. The product, 2-{[5-(12-benz[b]acridinylamino)pentyl]ethylamino}ethanol, disalicylate, is collected by filtration, washed with acetone, dried in air and recrystallized from ethanol.

2-[(5-aminopentyl)ethylamino]ethanol, employed as a starting material for the above procedure, can be prepared as follows: a mixture of 480 g. of 2-ethylaminoethanol, 220 g. of N-(5-bromopentyl)phthalimide and 2 liters of xylene is boiled under reflux for eighteen hours. Upon cooling, one mole of potassium carbonate is added with stirring, and the xylene and excess amine are removed in vacuo. The residue is extracted with methylene chloride; evaporation of the methylene chloride in vacuo leaves the crude N-{5-[ethyl-(2-hydroxyethyl)amino]pentyl}phthalimide as a viscous oil.

The crude phthalimide is hydrolyzed by refluxing the crude material with 400 ml. of 20 percent hydrochloric acid for four hours. Upon cooling the mixture, phthalic acid separates and is collected by filtration. Neutralization of the filtrate with a saturated potassium hydroxide solution at 10° C. causes the free amine to separate as a yellow oil. The oil is separated from the alkaline solution, and is repeatedly dried over solid potassium hydroxide. Distillation of the oil in vacuo gives the desired 2-[(5-aminopentyl)ethylamino]ethanol as a colorless liquid, B.P. 103–105° C./1.5 mm., $n_D^{25}$ 1.4870.

Example 7

A mixture of 26.3 g. of 12-chlorobenz[b]acridine and 120 g. of phenol is stirred and heated on the steam bath for fifteen minutes; subsequently, 17 g. of 1-(3-aminopropyl)-3-piperidinol, is added, and the mixture stirred and heated on the steam bath for three hours. Upon cooling, the reaction mixture is poured with stirring into a solution of 30 ml. of concentrated hydrochloric acid in 500 ml. of acetone. After chilling, the mixture is diluted with acetone and ether, and the precipitated benz[b]acridine is collected by filtration and washed with acetone. Crystallization of the residue from an ethanol-ethyl acetate mixture gives the desired 1-[3-(12-benz[b]acridinylamino)propyl]-3-piperidinol, dihydrochloride.

1-(3-aminopropyl)-3-piperidinol, employed as a starting material for the above procedure, can be prepared from 3-piperidinol and acrylonitrile in accordance with the method set forth under Example 1 herein for the preparation of 2-[3-aminopropyl)pentylamino]ethanol.

Example 8

A mixture of 29.8 g. of 12-chlorobenz[b]acridine and 120 g. of phenol is stirred and heated on the steam bath for fifteen minutes and 20 g. of 2,2'-(4-aminopentylimino)diethanol is subsequently added. After heating for three hours on the steam bath, the mixture is cooled and poured with stirring into a solution of 30 ml. of concentrated hydrochloric acid in 500 ml. of acetone. After chilling, the precipitated benz[b]acridine is collected by filtration and washed with acetone. The product, 2,2'-[4-(12-benz[b]acridinylamino) - pentylimino]diethanol, dihydrochloride, may be crystallized from methanol.

2,2'-(4-aminopentylimino)diethanol, employed as a starting material for the above procedure, can be prepared as follows: a mixture of 60 g. of 5-chloro-2-pentanone and 105 g. of diethanolamine in 300 ml. of absolute ethanol is refluxed for fifty-two hours. Volatile materials are removed in vacuo, water is added, and the mixture extracted with chloroform. The combined chloroform extracts are dried over potassium carbonate, and the chloroform removed in vacuo to give 66 g. of the crude 5-bis(2-hydroxyethyl)amino-2-pentanone.

The crude aminoketone is added portionwise without further purification to a cold solution of 25 g. of hydroxylamine hydrochloride in 50 ml. of water. The solution is boiled under reflux for one hour, and allowed to stand at room temperature for twenty hours. The mixture is diluted with 70 ml. of water, cooled, saturated with anhydrous potassium carbonate and extracted with chloroform. The combined chloroform extracts are dried over magnesium sulfate, the drying agent collected by filtration, and the chloroform concentrated in vacuo to give 62 g. of the crude 5-bis(2-hydroxyethyl)amino-2-pentanone oxime.

Without further purification, 62 g. of the above oxime is dissolved in 200 ml. of 95% ethanol and hydrogenated at 70° over Raney nickel catalyst at an initial hydrogen pressure of 900 p.s.i.g. The theoretical amount of hydrogen is absorbed in three hours, the catalyst is removed by filtration, and the ethanol removed in vacuo. Distillation of the residue yields the desired 2,2'-(4-aminopentylimino)diethanol as a colorless liquid, B.P. 161–164° C./1.5 mm.

Example 9

A mixture of 13 g. of 12-chlorobenz[b]acridine and 40 g. of phenol is stirred and heated on a steam bath for fifteen minutes and 5.2 g. of 2-[(2-aminoethyl)amino]ethanol is subsequently added. After heating for about three hours on the steam bath, the mixture is cooled to 50° C. and slowly poured into a stirred solution of 50 cc. of concentrated hydrochloric acid in 500 cc. of acetone. Upon cooling, the precipitated solid is collected by filtration. Recrystallization from methanol gives 2-{[2-(12-benz[b]acridinylamino)ethyl]amino}ethanol, dihydrochloride. In monohydrate form this product melts with decompositon at 200–202° C.

Example 10

A mixture of 26.4 g. of 12-chlorobenz[b]acridine, 20 g. of 2-[(4-aminopentyl)ethylamino]ethanol, and 60 g. of phenol is stirred and heated at 120–130° C. for two hours. Upon cooling, the reaction mixture is stirred into an excess of 20% sodium hydroxide solution, and the product extracted with chloroform. The chloroform extracts are washed with several portions of 10% sodium hydroxide and water, and are treated with decolorizing charcoal. The chloroform solution is evaporated to an oil, which is dissolved in ether. The ether solution is washed with water, and extracted with 10% acetic acid until the extracts give no precipitate with ammonium hydroxide. The acetic acid extracts are treated with decolorizing charcoal, filtered, made alkaline with 20% sodium hydroxide solution and again extracted with ether; the ether extracts are washed with water and dried over anhydrous potassium carbonate. Upon treatment with excess alcoholic hydrogen chloride, a waxy material precipitates. The crude benz[b]acridine is dissolved in methanol, the solvent evaporated and the residue powdered in a mortar and allowed to dry at room temperature for twenty-four hours. This is the desired 2{[4-(12-benz[b]acridinylamino)pentyl]ethylamino}ethanol, dihydrochloride.

2-[(4-aminopentyl)ethylamino]ethanol, employed as a starting material for the above procedure, can be prepared as follows: a mixture of 65 g. of 5-chloro-2-pentanone, 98 g. of 2-ethylaminoethanol, 80 g. of sodium chloride, and 280 ml. of xylene is stirred and heated on a steam bath for two hours, then refluxed for three hours. After standing for twenty hours, the mixture is filtered and the precipitate washed with warm xylene and discarded. The xylene is removed from the combined filtrates on the steam bath and the residue distilled in vacuo to give 5-(ethyl, 2-hydroxyethylamino)-2-pentanone, B.P. 96–98° C./1 mm., $n_D^{25}$ 1.4586.

The above ketone (28 g.) is dissolved in 40 g. of 25% ammoniacal methanol and hydrogenated at 1000 p.s.i.g. in the pressure of Raney nickel catalyst. After twelve hours, the catalyst is collected by filtration and the more volatile materials are removed on the steam bath. Distillation of the residue in vacuo gives the desired 2-[(4-aminopentyl)ethylamino]ethanol as a colorless oil, B.P. 101–104° C./1 mm., $n_D^{25}$ 1.4701.

Example 11

A hot, filtered solution of 9.7 g. of 2-{[4-(12-benz[b]acridinylamino)pentyl]ethylamino}ethanol, dihydrochloride, hemihydrate in 100 ml. of water is added slowly with stirring to a hot, filtered solution of 15.5 g. of sodium 8-hydroxy-7-iodo-5-quinolinesulfonate in 500 ml. of water. Upon cooling, the precipitate is collected by filtration and crystallized from an ethanol-acetone mixture to give the desired 2-{[4-(12-benz[b]acridinylamino)pentyl]ethylamino}ethanol, bis - (8 - hydroxy - 7-iodo-5-quinoline sulfonic acid) salt.

Example 12

A mixture of 26.4 g. of 12-chlorobenz[b]acridine and 130 g. of phenol is stirred and heated on the steam bath for fifteen minutes. Subsequently, 17.2 g. of 1-(3-aminopropyl)-3-piperidinemethanol is added, and the mixture stirred and heated on the steam bath for three hours. The cooled reaction mixture is poured with stirring into a solution of 30 ml. of concentrated hydrochloric acid in 1 liter of acetone, and the resulting mixture diluted with an acetone-ether mixture. The benz[b]acridine which separates is collected by filtration, washed with acetone and dried in vacuo. Crystallization of the yellow product from a methanol-ethyl acetate mixture gives the desired 1-[3-(12-benz[b]acridinylamino)propyl]-3-piperidinemethanol, dihydrochloride.

1-(3-aminopropyl)-3-piperidinemethanol, employed as a starting material for the above procedure, can be prepared from 3-piperidinemethanol and acrylonitrile in accordance with the method set forth under Example 1 herein for the preparation of 2-[(3-aminopropyl)pentylamino]ethanol.

Example 13

A mixture of 50 g. of 12-chlorobenz[b]acridine and 200 g. of phenol is stirred and heated on a steam bath for fifteen minutes and 23.6 g. of 2-[(3-aminopropyl)-amino]ethanol is added. Heating and stirring are continued for two hours and the cooled mixture is poured into a solution of 33 ml. of concentrated hydrochloric acid in 1000 ml. of acetone. The yellow precipitate obtained on chilling the mixture is collected by filtration, washed with acetone and dried. The product, 2-{[3-(12-benz[b]acridinylamino)propyl]amino}ethanol, dihydrochloride, is purified by dissolving in methanol and reprecipitating with ethyl acetate.

Example 14

A mixture of 2.8 g. of 12-chlorobenz[b]acridine, 15 g. of phenol and 1.5 g. of 1-(3-aminopropyl)-3-pyrrolidinol and 0.1 g. of cuprous chloride is stirred and heated on the steam bath for three hours. The mixture is cooled, poured into an excess of sodium hydroxide and ice, and the base extracted with chloroform. The combined chloroform extracts are thoroughly washed with 5 percent sodium hydroxide solution and water, and dried over anhydrous potassium carbonate. The drying agent is collected by filtration, the chloroform is evaporated in vacuo, and the residue dissolved in 50 ml. of methanol. This methanol solution is slowly added to a warm solution 9.2 g. of fumagillin in 150 ml. of methanol. The solvent is removed in vacuo, and the desired 1-[3-(12-benz[b]-acridinylamino)propyl]-3-pyrrolidinol, bisfumagillin salt is caused to separate as a powder by trituration of the residue with an acetone-ether mixture.

1-(3-aminopropyl)-3-pyrrolidinol, employed as a starting material for the above procedure, can be prepared from 3-pyrrolidinol and acrylonitrile in accordance with the method set forth under Example 1 herein for the preparation of 2-[(3-aminopropyl)pentylamino]ethanol.

Example 15

A mixture of 26.4 g. of 12-chlorobenz[b]acridine and 130 g. of phenol is stirred and heated on the steam bath for fifteen minutes. 1-(3-aminopropyl)-4-piperidinol (18 g.) is then added, and the mixture is heated on a steam bath with stirring for three hours. The cooled reaction mixture is poured with stirring into a solution of 30 ml. of concentrated hydrochloric acid in 600 ml. of acetone, and the resulting mixture diluted with acetone and ether. The benz[b]acridine which separates is collected by filtration, washed with acetone and dried in vacuo. Crystallization of the crude product from a methanol-ethyl acetate mixture gives the desired 1-[3-(12-benz[b]acridinylamino)propyl]-4-piperidinol, dihydrochloride.

1-(3-aminopropyl)-4-piperidinol, employed as a starting material for the above procedure, can be prepared from 4-piperidinol and acrylonitrile in accordance with the method set forth under Example 1 herein for the preparation of 2-[(3-aminopropyl)pentylamino]ethanol.

This application is a continuation-in-part of our co-pending application Serial No. 395,831, filed December 2, 1953, and now abandoned.

We claim:

1. A member of the group consisting of a free base and non-toxic acid salts thereof, said free base having the formula,

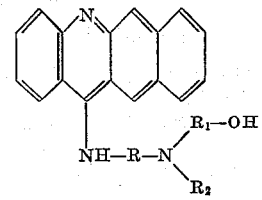

where R is a divalent alkyl radical containing from 2 to 5 carbon atoms inclusive, $R_1$ represents a divalent alkyl radical containing from 2 to 6 carbon atoms inclusive and $R_2$ represents a member of the group consisting of hydrogen and alkyl and hydroxyalkyl radicals containing from 2 to 6 carbon atoms inclusive and, as further members when taken together with —$R_1$OH and —N<, hydroxy-, hydroxymethyl- and hydroxyethyl pyrrolidino and piperidino radicals.

2. 2,2' - [3-(12-benz[b]acridinylamino)propylimino]-diethanol.

3. A non-toxic acid salt of the product of claim 2.

4. 2 - {[3 - (12 - benz[b]acridinylamino)propyl]ethylamino}ethanol.

5. 2 - {[4 - (12 - benz[b]acridinylamino)pentyl]ethylamino}ethanol.

6. 1 - [3 - (12 - benz[b]acridinylamino)propyl] - 3 - piperidinol.

7. 2,2' - [4 - (12 - benz[b]acridinylamino)pentylimino]diethanol.

8. Process for the production of benz[b]acridine compounds having in free base form the formula,

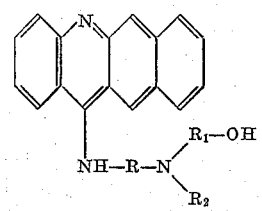

which comprises condensing an amino alcohol having the formula,

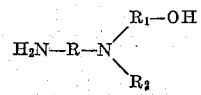

with a 12-substituted benz[b]acridine compound having the formula,

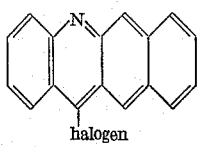
halogen where R is a divalent alkyl radical containing from 2 to 5 carbon atoms inclusive, $R_1$ is a divalent alkyl radical containing from 2 to 6 carbon atoms inclusive and $R_2$ is a member of the group consisting of hydrogen and alkyl and hydroxyalkyl radicals containing from 2 to 6 carbon atoms inclusive and, as further members when taken together with —$R_1$OH and —N<, hydroxy-, hydroxymethyl- and hydroxyethyl pyrrolidino and piperidino radicals.

9. Process according to claim 8 wherein the condensation is carried out at temperatures in excess of 75° C.

References Cited in the file of this patent

UNITED STATES PATENTS

| | | |
|---|---|---|
| 2,083,908 | Hata et al. | June 15, 1937 |
| 2,531,010 | Surrey | Nov. 21, 1950 |
| 2,773,064 | Elslager | Dec. 4, 1956 |

OTHER REFERENCES

Wiselogle: Survey of Anti Malaria Drugs, vol. LL, sec. 2, pp. 1380–1382 (1946).